United States Patent Office 2,830,164
Patented Apr. 8, 1958

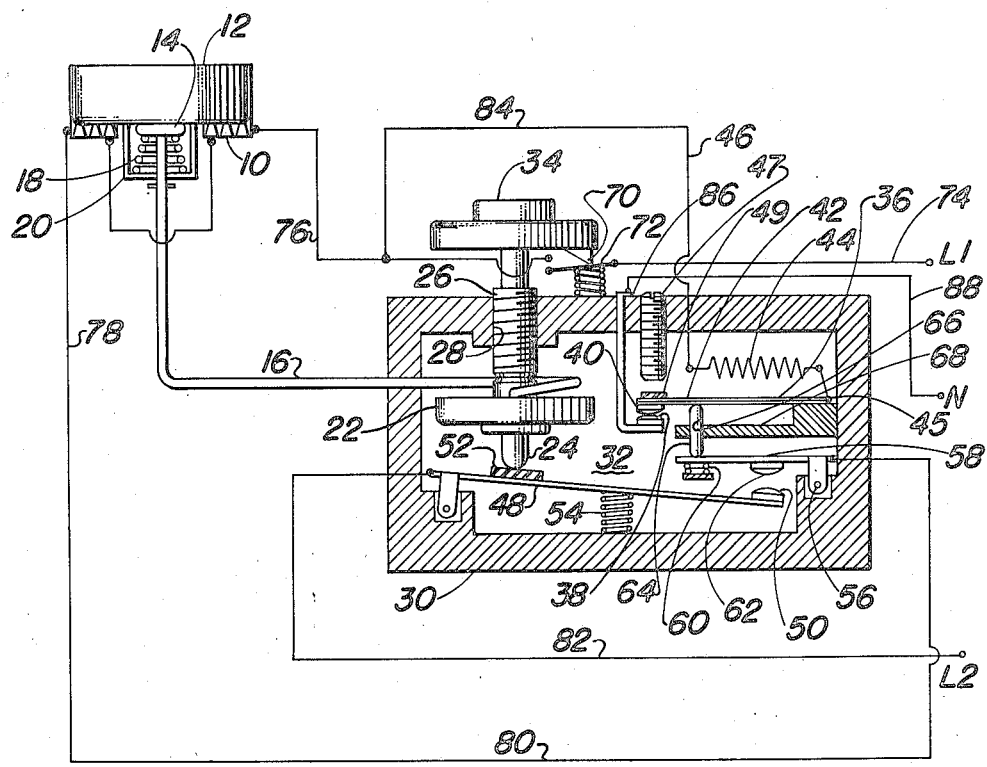

2,830,164

TEMPERATURE RESPONSIVE CONTROL

Victor Weber, Greensburg, Hugh J. Tyler, Hempfield Township, and William J. Russell, Jeannette, Pa., assignors to Robertshaw-Fulton Controls Company, Greensburg, Pa., a corporation of Delaware Application December 17, 1954, Serial No. 475,954

3 Claims. (Cl. 219—20)

This invention relates to an improved control mechanism for regulating the heat output of a heating element, more particularly, a surface heating element of an electric range.

Many foods require rapid initial heating to bring them to a predetermined temperature and thereafter require a reduced amount of heat input to maintain such predetermined temperature. Hence, it is an object of this invention to effect such a cooking operation by permitting the heating element to operate at full energy input until the temperature of the food to be cooked reaches a predetermined value, and then continuing the cooking operation while proportionately reducing the energy input to the heating element to increase the temperature of the food up to a desired predetermined control temperature.

In accordance with the present invention, a control mechanism for surface heating elements is provided which automatically regulates the wattage input to the heating element to thereby regulate the heat output.

In a preferred embodiment of the invention, a switch mechanism is provided for periodically making and breaking the circuit to the heating element and a thermostatically operated switch regulates the duration during which energy is supplied to the heating element when the periodic switch mechanism is closed during the "on" portion of its cycle. The thermostatically controlled switch is permitted to remain closed by being made to follow the switch arm of the periodically actuated switch mechanism for supplying maximum power to the heating element during the initial stages of heating of the contents of a cooking vessel. Upon reaching a first predetermined temperature, which is slightly below the desired predetermined temperature, the thermostatically controlled switch is restrained from following the switch arm during a complete cycle thereof and an intermittent supply of power is permitted to reach the heating element. This supply of power is proportionally lessened as the temperature of the cooking vessel approaches the desired predetermined temperature as the amount of energy supplied to the heating element will be determined by the length of time in which the thermostatically controlled switch is closed during the "on" portion of each cycle of the periodically actuated switch.

Another object of the present invention is to automatically regulate the heat output of the surface heating element to maintain the contents of a cooking vessel, supported thereon, at a desired temperature.

Other objects and advantages will become apparent from the following description taken in connection with the accompanying drawing wherein there is shown a schematic view of the circuit for a surface heater of an electric range embodying the invention with the control devices therefor in section.

Referring more particularly to the drawing, an annular surface heating element 10 is adapted to be supported on the top plate of an electric range (not shown) in a manner well known in the art. The heating element 10 is adapted to support a cooking vessel 12 thereon and is provided with a temperature sensing bulb 14 which is located centrally thereof.

The bulb 14 takes the form of a flat, hollow container which communicates with a capillary tube 16 connected thereto and is biased toward the cooking vessel 12 by a spring 18 seated on a suitable stirrup 20. The particular structure of the bulb 14 is fully disclosed and claimed in our copending application Serial No. 555,645, filed December 27, 1955, and the structure of the mounting for the bulb is fully disclosed and claimed in our copending application, Serial No. 454,754, filed September 8, 1954.

The capillary tube 16 extends through the wall of a casing 30 and communicates with an expansible power element 22 which may consist of a pair of flexible diaphragms welded together at their peripheries and carrying a thrust button 24 on one side thereof. The other side of the power element 22 abuts a stud 26 which is threaded through a suitable aperture 28 formed in another wall of the casing 30. The capillary tube 16 serves to mount the power element 22 within a chamber 32 formed in the casing 30 and the power element 22 may be moved by operation of the stud 26.

The opposite end of the stud 26 projects out of the casing 30 and carries a manually operable knob or dial 34 which may be manipulated to rotate the stud 26 and thus effect the described axial adjustment of the power element 22 relative to the casing 30. The assembly of the bulb, capillary tube 16, and expansible power element 22 is filled with a suitable thermal fluid which will expand upon increase in temperature sensed by the bulb 14 to effect expansion of the power element 22.

Disposed within the chamber 32 is a cyclic or periodically actuated switch means indicated generally by the reference numeral 36 which includes means for periodically making and breaking a control circuit to be described hereinafter. The cyclic switch means 36 is here shown as comprising a fixed contact 38, a coacting movable contact 40 and a bi-metallic flexible switch arm 42. The movable contact 40 is carried on the free end of the switch arm 42 which is secured at its other end in the casing 30 by any suitable means. The bi-metallic switch arm 42 is positioned in the casing 30 to hold the movable contact 40 in engagement with the fixed contact 38 when the switch arm 42 is in its unheated condition. However, heating of the bi-metallic switch arm 42 will cause the same to flex and move the contact 40 out of engagement with the contact 38. The arm 42 is limited in its upward travel by a screw 47 carried by the casing 30 and is insulated therefrom by a pad 49 secured to the arm 42.

Means is provided for alternately heating and cooling the bi-metallic switch arm 42. To this end, a heating coil 44 is positioned within the casing 30 above the switch arm 42 and is connected at one end to one end 45 of the switch arm 42 and at the other end to a wire 46 which extends out of the casing 30.

The electrical connection between the various parts of the cyclic switch means will be understood from the description of the operation of the apparatus which is included hereinafter.

Also disposed within the chamber 32 is a switch arm 48 which is pivoted at one end to the casing and carries at its free end a movable contact 50. The switch arm 48 underlies the thrust button 24 of the power element 22 and carries a block of insulating material 52 which is engageable by the button 24. A spring 54 acts between the arm 48 and the casing 30 to bias the switch arm 48 in a counterclockwise direction, as viewed in the drawing, and into engagement with the button 24.

A switch arm 58 is spaced from the switch arm 48 and is pivoted at 56 to the casing 30. The switch arm 58 is biased in a clockwise direction by a spring 60 held in compression between the casing 30 and the free end of the arm 58. A movable contact 62 is carried on the medial portion of the switch arm 58 and is normally engageable with the contact 50. It is to be noted that the effective range of movement of the arm 58 is relatively small compared to the range of movement of the arm 48, therefore, the contact 50 is adapted to be moved through a proportionately larger distance than the contact 62.

Abutment means is provided for transmitting movement from the bi-metallic switch arm 42 to the switch arm 58 for a purpose which will appear more fully hereinafter. This means takes the form of a pin 64, made of non-conducting material, slidably received in an aperture 66 formed in an inwardly projecting wall 68 which is secured to the interior of the casing 30. The pin 64 extends between the switch arms 36, 58 and for all positions of the same the pin 64 is permanently in engagement therewith.

The dial 34 is provided with suitable cam means 70 which coact with a normally closed switch 72 to open the same in a selected position of the dial 34 and thereby establish an "off" position for the control.

Operation

The apparatus is shown in the drawing in the "off" position with no electrical energy being supplied to the surface heating element 10 or to the heating coil 44. To place the apparatus in operation, the dial 34 is rotated to a desired temperature setting. Such rotation of the dial 34 will move the cam means 70 out of engagement with the switch 72 and permit the latter to close. The temperature setting movement of the dial 34 will also serve to screw the stud 26 out of the casing 30 and move the power element upward, thereby permitting the movable contact 50 of the switch arm 48, to move into engagement with the movable contact 62.

The apparatus is thus conditioned to supply a steady flow of electrical energy to the surface heating element 10 through a circuit which may be traced as follows: from line wire L1 of a suitable three-wire power source through wire 74, switch 72, wire 76, heating element 10, wire 78, wire 80, switch arm 58, contacts 62, 50, switch arm 48, and wire 82 to line wire L2.

When power is so supplied to the heating element 10, heat will be generated thereby to raise the temperature in the cooking vessel 12 and the food contained therein.

At this point, a circuit is also completed through the heating coil 44 of the cyclic switch means 36. This circuit may be traced as follows: from line wire L1 through wire 74, switch 72, wire 76, wire 84, wire 46, heating coil 44, switch arm 42, contacts 40, 38, conductor 86, and wire 88 to neutral wire N of the three-wire power source. Thus, a voltage is impressed across the heating coil 44 causing current to flow in the same to raise the temperature thereof. The temperature increase of the heating coil 44 causes the bi-metal strip 42 to become heated and to flex thereby moving the movable contact 40 out of engagement with the fixed contact 38 and breaking the above-traced energizing circuit for the heating coil 44. The heating coil 44 will then cool and permit the bi-metal strip to cool and return the movable contact 40 into engagement with the fixed contact 38. Movement of the contact 40 into engagement with the contact 38 again completes the energizing circuit for the heating coil 44 and the cycle of the cyclic switch means 36 is repeated.

The cyclic flexing and unflexing of the bi-metallic arm 42 serves to reciprocate the pin 64 in a vertical plane and since the pin 64 is in continual contact with the switch arm 58 movement thereof is synchronous with the movement of the arm 42. It is to be noted that the circuit for the cycling switch 36 is independent of any other circuit in the control device, and the bi-metallic switch arm 42 will cycle whenever the switch 72 is closed by turning the dial 34 from its "off" position. Thus, as long as the switch 72 is closed, the switch arm 58 will continually cycle under the combined effort of the forces exerted on the pin 64 and the spring 60. As previously stated, the range of movement of the contact 50 is much greater than the range of movement of the contact 62. Therefore, it will be apparent that for certain positions of the switch arm 48, the contacts 50, 62 will be closed regardless of the position of the switch arm 58.

The initial temperature setting of the dial 34, as previously described, will move the stud 26 out of the casing 30 and move the power element upward. In so doing, a proportionate space is formed between the end of the button 24 and the block 52 allowing the spring 54 to bias the switch arm 48 in a counterclockwise direction to its uppermost position. In this position, the contact 50 will engage and continue to be engaged with the contact 62 for all positions of the switch arm 58, as will be understood from the following detailed operation of the cyclic mechanism.

Movement of the switch arm 58 downwardly under the force exerted by the bimetal arm 42 on the pin 64, forces the contact 62 downwardly against the bias of the spring 60 and since the contacts 50, 62 are abutting, the contact 50 is also moved downwardly against the bias of the spring 54. Upward movement of the arm 58, caused by the combined effect of the flexing of the bi-metal arm 42 and the expansion of the spring 60 will carry with it the contact 62, followed by the abutting contact 50 since the arm 48 is unrestricted in its upward movement.

As the temperature of the cooking vessel 12 rises, the temperature of the bulb 14 will increase to cause expansion of the power element 22. Expansion of the power element 22 will move the thrust button 24 into engagement with the block 52 to swing the switch arm 48 in a clockwise direction against the bias of the spring 54 and thereby prevent the contact 50 from continuously following the contact 62 through the full movement of the same. At this point, the temperature of the cooking vessel is near the desired selected temperature as set by the dial 34.

Further heating of the vessel 12 and expansion of the power element 22 serves to lower the contact 50 until it no longer contacts the contact 62 during the time when the switch arm 58 is in its uppermost position. The expansion of the element 22, in effect, intercepts the upward movement of the arm 48 allowing the contacts 50, 62 to separate and permit the contact 62 and the arm 58 to move freely upward during this portion of the cyclic movement thereof.

At this stage of the operation, the contact 62 is moving periodically into and out of engagement with the contact 50 by action of the bi-metallic switch arm 42 and the heating coil 44 through the intermediary motion transmitting means 64. Accordingly, power is supplied to the surface heating element 10 intermittently and the total amount of electrical energy supplied to the surface heating element 10 will be determined by the positioning of the contact 50, since the position of the contact 50 will determine how long its engagement with the contact 62 will exist during the cycling of the contact 62. At the instant that the contact 62 is in its uppermost position and the power element 22 has expanded to a point where the contact 50 will just disengage itself from contact 62, a considerable supply of electrical energy is still being supplied to the heating element 10. Further expansion of the power element 22 lowers the contact 50 such that the time of engagement of the contact 50 with the contact 62 is lessened and less power is supplied to the heating element 10. This stage of operation continues and causes movement of the contact 50 away from the contact 62 in proportion to the expansion of the power element 22. A consequent increase in the temperature of the cooking vessel 12 occurs until a desired selected temperature is reached at which time the contact 50 has moved sufficiently to remain open regardless of the positioning of the contact 62.

It is to be noted that after the steady and intermittent energizing circuits for the heating element 10 are broken the heating coil 44 is energized from the circuit traced above, since this circuit is independent of the energizing circuit for the heating element 10. Thus, the cyclic switch means 36 continues to cycle and is conditioned to take over the control of the energization of the heating element 10 at any time.

As the temperature of the vessel 12, as sensed by the bulb 14 drops, the power element 22 will contract to permit the switch arm 48 to move in a counterclockwise direction under the bias of the spring 54. This movement of the switch arm 48 will move the contact 50 into engagement with the contact 62 for a small increment of time of the "on" portion of the cycling of the switch arm 58 and to once again complete the intermittent energizing circuit for the heating element 10 and restore the heat supply to the vessel 12. Usually the restoration of the reduced rate of heat input will serve to restore the desired control temperature to the vessel 12 to again cause expansion of the power element 22 and the proportional movement of the contact 50. However, in the event that the reduced heat input is not sufficient to restore the desired temperature, such as is the case when a substantial amount of food or liquid is placed into the cooking vessel 12, the power element 22 may contract sufficiently to permit the contact 50 to continuously engage and follow the contact 62 thereby completing the circuit for continuously supplying electrical energy to the heating element 10.

It will be apparent from the foregoing that the apparatus shown in the drawing is operative to bring the temperature of the cooking vessel rapidly up to a temperature approaching the desired control temperature by supplying power continuously to the heating element 10 and thereafter affecting a gradual temperature rise of the cooking vessel 12 to the selected cooking temperature by supplying power in proportion to the temperature differential between the desired control temperature and the actual temperature of the cooking vessel 12 at any instant. Subsequent maintenance of the selected temperature of the cooking vessel 12 is effected by supplying intermittent or continuous power to the heating element 10 in response to temperature variations of the cooking vessel 12.

While only one embodiment of the invention has been herein shown and described, it will be obvious to those skilled in the art that the invention may be variously embodied and that changes may be made in the construction and arrangement of parts without departing from the scope of the invention as defined in the appended claims.

We claim:

1. Control mechanism for an electric heater assembly having a surface heater for supporting a vessel and a source of electric energy, comprising a first circuit means including a switch for connecting the heater to the source of electric energy to provide a continuous supply of electric energy to the heater for heating the vessel, said switch having a pair of normally engaging contacts, means for periodically moving one of said contacts toward and away from the other including a bimetallic element, abutment means for operatively connecting said bimetallic element to said one contact, and electric heating means positioned in the thermal relation to said bimetallic element to heat the same when energized to thereby cause said bimetallic element to warp, a second circuit means for energizing said heating means, said second circuit means being electrically connected to said source of electric energy for operation independent of said first circuit means, and means adapted to respond to the temperature variations of the vessel for positioning the other of said contacts to vary the period of contact engagement with one of said contacts and thereby control the supply of electric energy to said heater.

2. Mechanism as claimed in claim 1 wherein said bimetallic element is positioned to act as an electrically conducting portion of said second circuit means.

3. Mechanism as claimed in claim 1 wherein said abutment means includes a slidably mounted pin member positioned to engage said bimetallic element at one end thereof and said one contact at the other end thereof, and resilient means for retaining said pin member permanently in engagement with said bimetallic element and said one contact.

References Cited in the file of this patent

UNITED STATES PATENTS

| | | |
|---|---|---|
| 2,200,995 | Proctor | May 14, 1940 |
| 2,210,947 | Myers et al. | Aug. 13, 1940 |
| 2,224,596 | Defachelles | Dec. 10, 1940 |
| 2,320,895 | Sherlock et al. | June 1, 1943 |
| 2,399,423 | Bletz | Apr. 30, 1946 |
| 2,500,061 | Clark | Mar. 7, 1950 |
| 2,524,506 | Akeley | Oct. 3, 1950 |
| 2,767,293 | Jordan | Oct. 16, 1956 |
| 2,790,057 | Schauer | Apr. 23, 1957 |